(12) United States Patent
Corless

(10) Patent No.: US 7,976,422 B2
(45) Date of Patent: *Jul. 12, 2011

(54) DIFFERENTIAL WITH CROSS PIN RETENTION SYSTEM AND METHOD FOR ASSEMBLY

(75) Inventor: Daniel G. Corless, Allen Park, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/688,962

(22) Filed: Jan. 18, 2010

(65) Prior Publication Data

US 2010/0113207 A1    May 6, 2010

Related U.S. Application Data

(63) Continuation of application No. 11/840,309, filed on Aug. 17, 2007, now Pat. No. 7,648,438.

(51) Int. Cl.
   *F16H 48/08*    (2006.01)
(52) U.S. Cl. ...................................... 475/230
(58) Field of Classification Search .................. 475/230, 475/231, 336
   See application file for complete search history.

(56) References Cited

U.S. PATENT DOCUMENTS

| | | | |
|---|---|---|---|
| 1,544,363 | A | 6/1925 | Alden |
| 4,808,934 | A | 2/1989 | Yokoyama et al. |
| 4,864,890 | A | 9/1989 | Friedrich et al. |
| 5,273,498 | A | 12/1993 | Dhillon et al. |
| 6,014,916 | A | 1/2000 | Tyson |
| 6,254,505 | B1 | 7/2001 | Forrest |
| 6,802,793 | B2 | 10/2004 | Zink et al. |
| 2006/0128516 | A1 | 6/2006 | Valente |

FOREIGN PATENT DOCUMENTS

| | | |
|---|---|---|
| JP | 04-121225 | 4/1992 |
| JP | 09-317850 | 12/1997 |
| JP | 2000-297856 A | 10/2000 |

*Primary Examiner* — David D Le
*Assistant Examiner* — Erin D Bishop
(74) *Attorney, Agent, or Firm* — Harness, Dickey & Pierce, P.L.C.

(57) ABSTRACT

A differential assembly includes a retainer for a cross pin having a bore aligned with a bore formed in a differential housing. The cross pin retainer is positionable at partially-inserted and fully-inserted positions within the cross pin and differential bores. At a first rotational orientation, the cross pin retainer is positionable in its partially-inserted position to temporarily retain the cross pin within the differential housing. At a second rotational orientation, the cross pin retainer is positionable in its fully-inserted position to retain the cross pin within the differential housing. Features of the cross pin retainer cooperate with surfaces formed in the differential housing to allow the cross pin retainer to be fixedly positioned and secured within the differential housing.

22 Claims, 9 Drawing Sheets

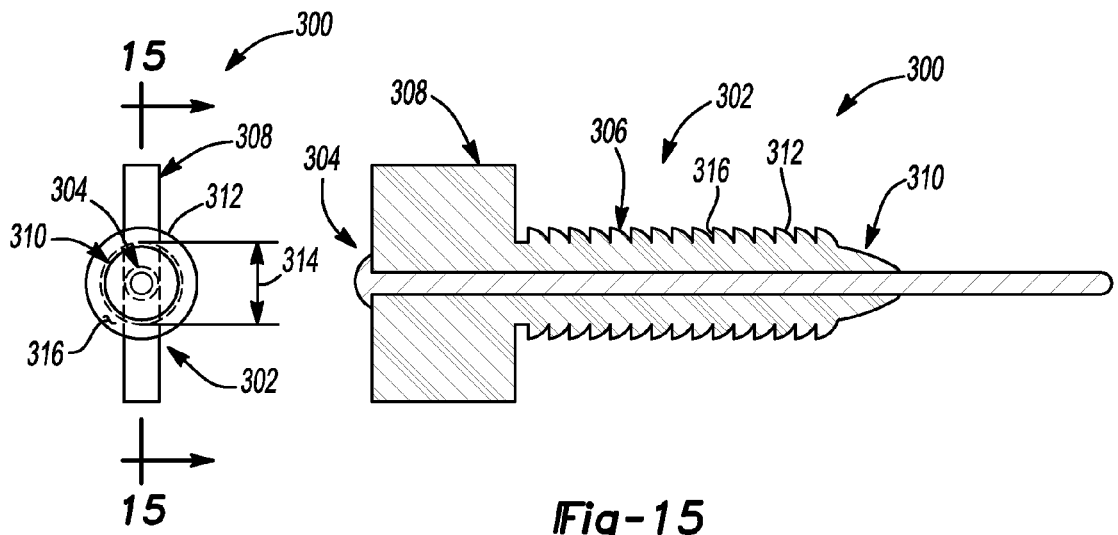
Fig-14
Fig-15
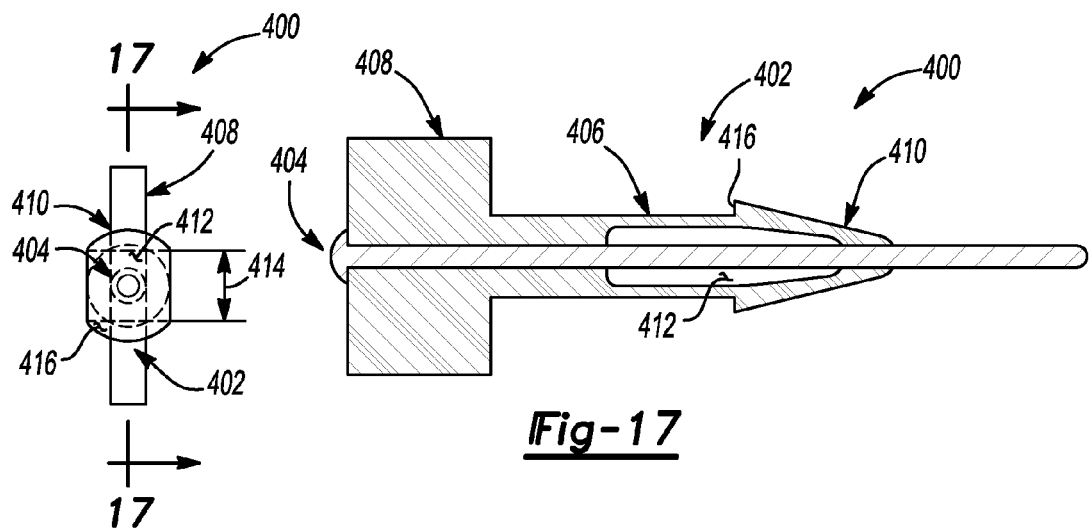
Fig-16
Fig-17

DIFFERENTIAL WITH CROSS PIN RETENTION SYSTEM AND METHOD FOR ASSEMBLY

CROSS-REFERENCE TO RELATED APPLICATIONS

This application is a continuation of U.S. patent application Ser. No. 11/840,309 filed on Aug. 17, 2007, now U.S. Pat. No. 7,648,438. The entire disclosure of the above application is incorporated herein by reference.

FIELD

The present disclosure relates generally to differentials for use in automotive drivelines and, more particularly, to a method and an apparatus for retaining a cross pin within a differential housing.

BACKGROUND

The statements in this section merely provide background information related to the present disclosure and may not constitute prior art.

Many automotive drive axle assemblies include a hypoid gearset and a differential for changing the direction of power transmission from an axis parallel to the direction of vehicle travel to an axis perpendicular thereto. The hypoid gearset typically includes a ring gear coupled to a differential housing which is meshed with a pinion gear rotatably supported within the axle housing. To facilitate proper function of the drive axle assembly, the differential is rotatably mounted on a pair of differential bearings. The differential in most automotive drive axle assemblies includes a gearset which is supported within the differential housing to facilitate relative rotation between a pair of axle shafts. The differential gearset typically includes a pair of side gears that are coupled to the ends of axle shafts. The side gears are meshed with at least one set of pinions rotatably supported on a cross pin that is coupled to the differential housing.

Various methods are known for securing the cross pin to the differential housing. For example, at least one known differential uses a threaded fastener, such as a lock screw or bolt, to secure the cross pin to the differential housing. The threaded fastener extends through an aperture in the differential cross pin and is threadingly engaged with a hole in the differential housing. As an alternative, a roll-pin may be inserted between aligned holes in the differential housing and the cross pin to provide a non-threaded retention mechanism. Another known method of securing the differential cross pin includes positioning a snap ring within a groove formed in the cross pin and a corresponding groove formed in the differential housing.

The above-noted cross pin retention mechanisms may require costly machining operations to be performed on the differential housing, the cross pin or both. Furthermore, a costly and time-consuming torquing operation may be required when using a threaded fastener. Additionally, these retention methods may not permit convenient removal of the cross pin during assembly of the differential or axle assembly. Elimination of the torquing process or lock ring assembly steps may also be beneficial in reducing the time and cost required to manufacture the differential. In addition, the ability to conveniently remove the cross pin during the assembly process may be beneficial to reduce the time and cost required to interconnect the axle shafts to the side gears of the differential.

SUMMARY

The present disclosure provides an arrangement for securely retaining the cross pin within the housing of a differential assembly. The improved arrangement for retaining the cross pin includes the use of a cross pin retainer which permits relatively simple and rapid assembly of the differential assembly. The cross pin retainer is positionable at a first or partially-inserted position to temporarily retain the cross pin within the differential housing and to permit easy removal of the cross pin retainer and cross pin during assembly of the axle assembly. When located in its partially-inserted position, a portion of the cross pin retainer elastically deforms and snugly engages a retention bore formed in the differential housing.

The cross pin retainer is also positionable at a second or fully-inserted position to permit retention of the cross pin within the differential housing. When located in its fully-inserted position, a portion of the cross pin retainer expands to engage a wall in the differential housing to restrict subsequent retraction of the cross pin retainer. Additionally, the cross pin retainer and the differential housing include surfaces that cooperate to facilitate the partial and full insertion of the cross pin retainer into the differential assembly.

The present disclosure eliminates the need for costly machining operations previously required to provide an annular grove or throughbore in the differential housing. The present disclosure also provides for increased case strength by permitting use of smaller bore sizes in the differential housing. Finally, the present disclosure provides a method which may reduce the cost of a differential assembly by providing simpler manufacturing methods. Accordingly, costs are further minimized by reducing the time required to assemble the differential assembly and install the various components of an axle assembly.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings. The drawings described herein are for illustration purposes only and are not intended to limit the scope of the present disclosure in any way.

FIG. 14 is an end view of another cross pin retainer according to the present disclosure;

FIG. 15 is a sectional side view of the cross pin retainer shown in FIG. 14;

FIG. 16 is an end view of yet another cross pin retainer according to the present disclosure; and FIG. 17 is a sectional side view of the cross pin retainer shown in FIG. 16.

DETAILED DESCRIPTION

The following description is merely exemplary in nature and is in no way intended to limit the invention, its application, or uses.

Figure 1:
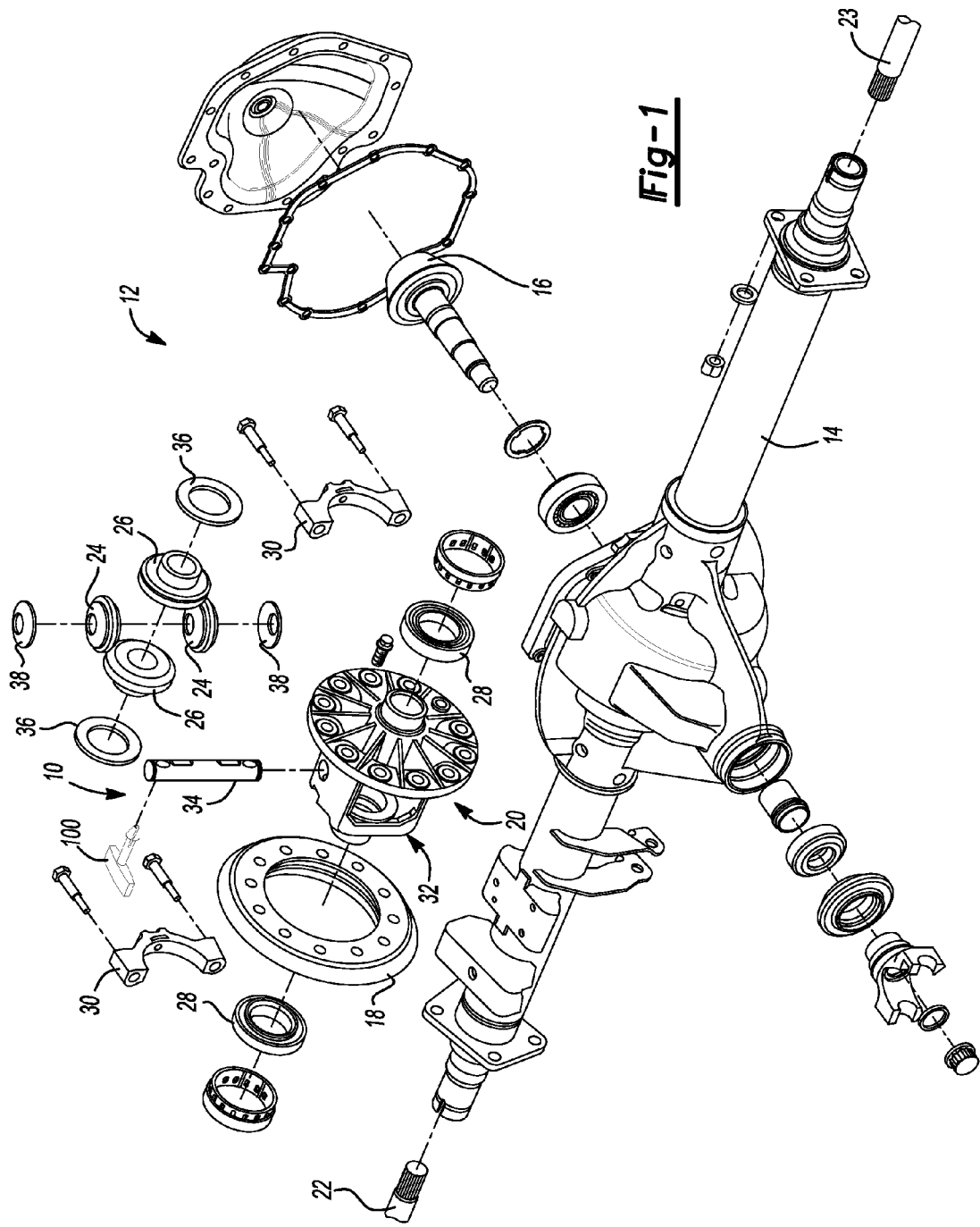
FIG. 1 is an exploded perspective view of an exemplary drive axle assembly equipped with a differential assembly having a cross pin retention system according to the present disclosure.
Figure 2:
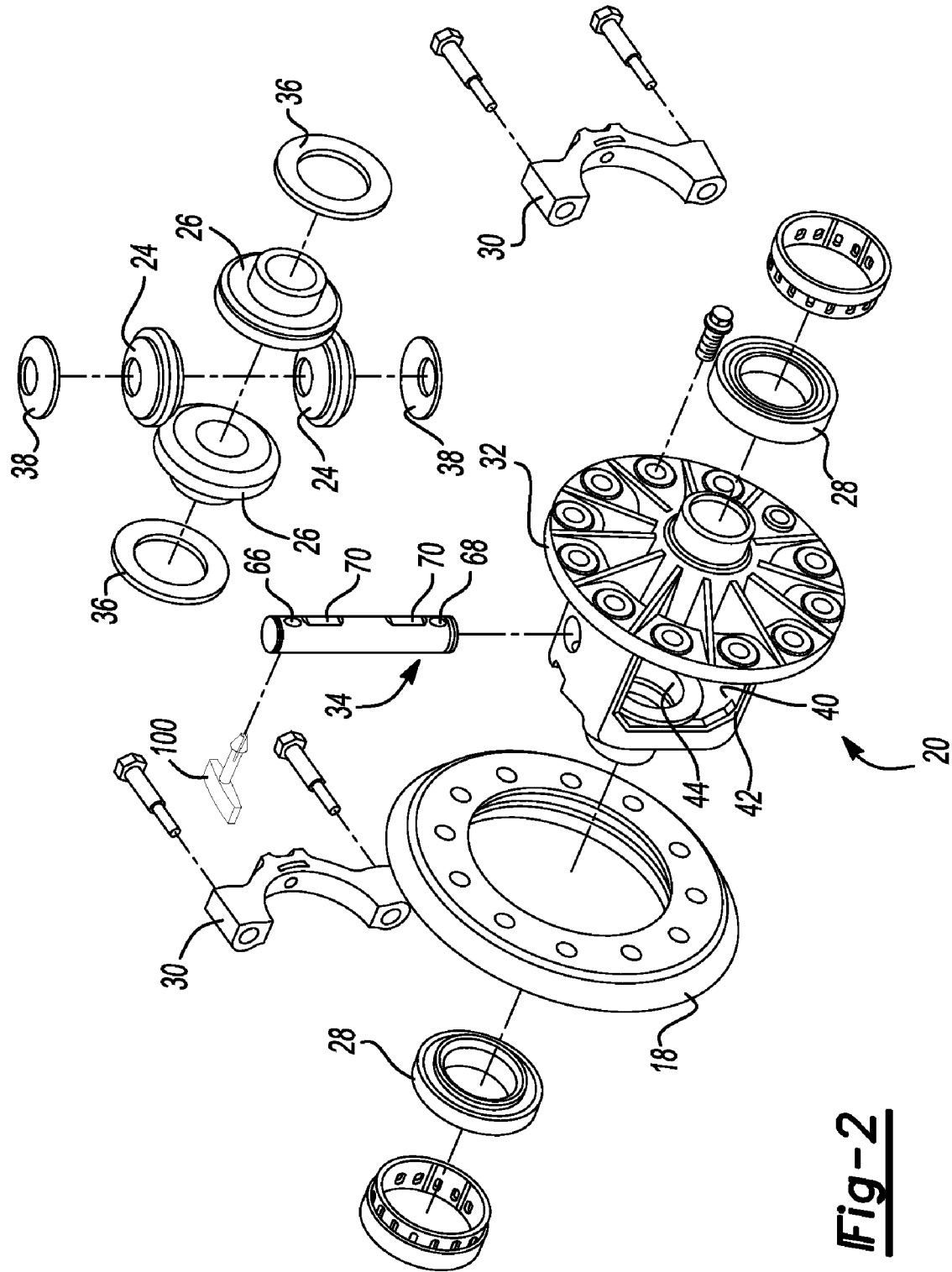
FIG. 2 is an exploded perspective view of the differential assembly having a cross pin retention system according to the present disclosure.

With reference to FIGS. 1 and 2, a cross pin retention system is generally identified by reference numeral 10. Cross pin retention system 10 is shown operatively associated with an exemplary drive axle assembly 12. Drive axle assembly 12 includes an axle housing 14 for rotatably supporting a hypoid gearset including a pinion gear 16 and a ring gear 18 which is secured to a differential assembly 20. Differential assembly 20 functions to transfer power from pinion gear 16 to a pair of axle shafts 22 and 23 while compensating for any difference in axle shaft rotary speeds as may occur during a turn or other steering maneuver.

In order to compensate for differences in the axle shaft rotary speeds, differential assembly 20 includes a pair of pinion gears 24 and a pair of side gears 26 which are drivingly interconnected to axle shafts 22 and 23. To facilitate proper function of axle assembly 12, differential assembly 20 is rotatably mounted in axle housing 14 by a pair of differential bearings 28. More particularly, housing 14 includes two semi-circular journals (not shown) for supporting approximately one-half of the circumferences of each differential bearing 28. A pair of bearing caps 30 generally supports the remaining approximate one-half of each differential bearing 28. Each bearing cap 30 is mounted to axle housing 14 in a manner conventional in the art such as via threaded fasteners.

Figure 3:
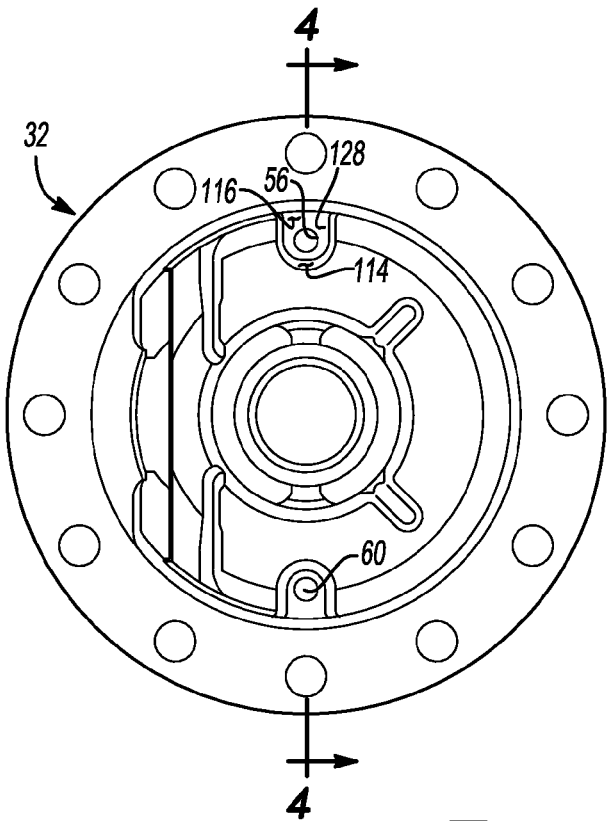
FIG. 3 is an end view of the differential housing shown in FIG. 2.
Figure 4:
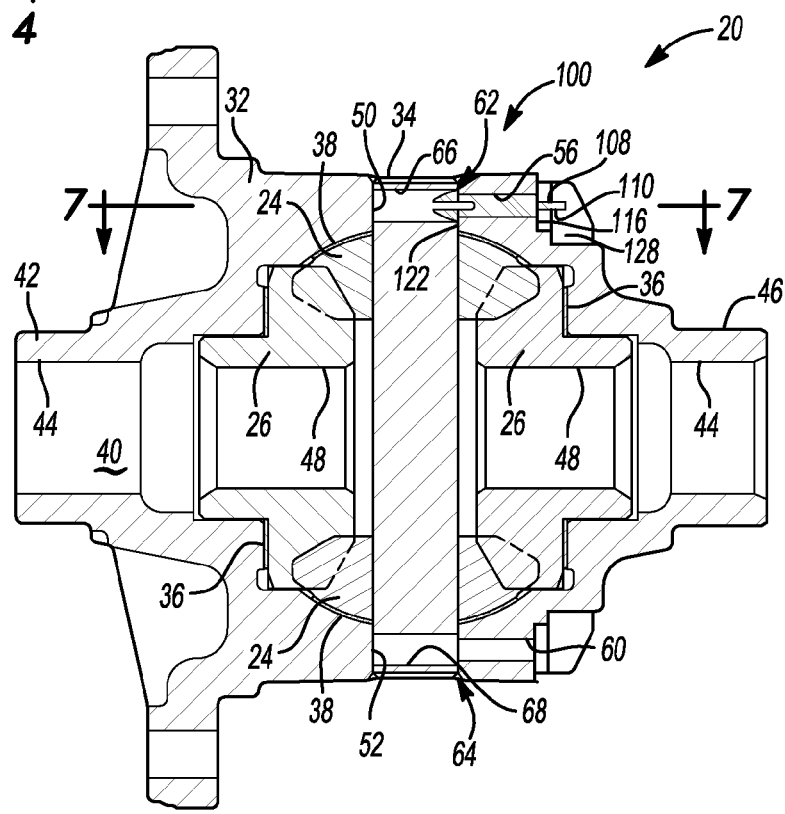
FIG. 4 is a sectional view of the differential housing shown in FIG. 3.

Referring primarily to FIGS. 2 through 4, differential assembly 20 includes a differential case or housing 32, a cross pin 34, a pair of side gear washers 36 and a pair of pinion gear washers 38 in addition to pinion gears 24 and side gears 26 previously introduced. Differential housing 32 includes an interior cavity 40 defined by a wall 42. Differential housing 32 includes a pair of axially aligned openings 44 extending through wall 42 and which interconnect interior cavity 40 with an external surface 46 of differential housing 32. Openings 44 are sized to rotatably support side gears 26. Openings 44 also allow axle shafts 22 and 23 to be inserted within interior cavity 40 and engage internal splines 48 on side gears 26.

Differential housing 32 also includes a first aperture 50 and a second aperture 52 that are axially aligned with one another. Each of first and second apertures 50 and 52 extends through wall 42 to interconnect interior cavity 40 with external surface 46 of differential housing 32. A first housing bore 56 extends through wall 42 from external surface 46 to intersect first aperture 50. A second housing bore 60 extends through wall 42 from external surface 46 to intersect second aperture 52.

Cross pin 34 is a generally cylindrically-shaped member having a first end 62 and a second end 64. First end 62 includes a first cross pin bore 66 while second end 64 includes a second cross pin bore 68. A pair of flats 70 (FIG. 2) are formed on cross pin 34 to function as lubricant reservoirs during operation. Cross pin 34 is positioned within first and second apertures 50 and 52 such that first cross pin bore 66 is aligned with first housing bore 56. Likewise, second end 64 of cross pin 34 is positioned within second aperture 52 to align second cross pin bore 68 with second housing bore 60.

Pinion gears 24 are rotatably supported on cross pin 34. Pinion gear washers 38 are positioned within interior cavity 40 between wall 42 and pinion gears 24. Each pinion gear washers 38 provides a thrust surface against which the pinion gears may bear. Similarly, side gear washers 36 are positioned between side gears 26 and differential housing 32.

Figure 5:
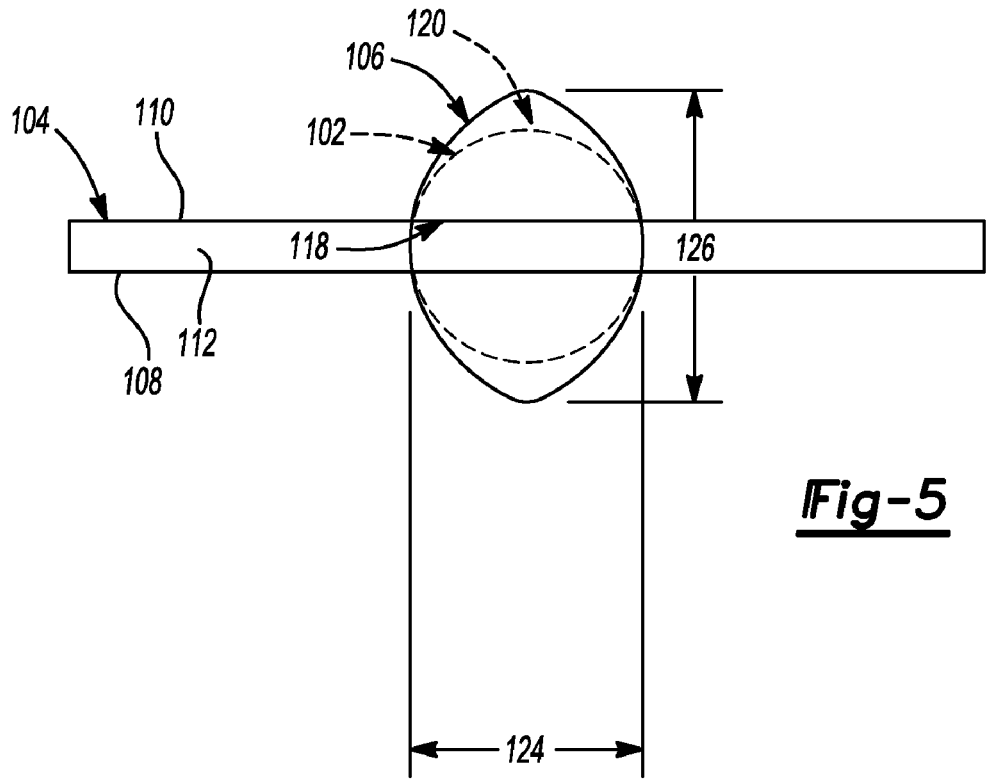
FIG. 5 is an end view of the cross pin retainer shown in FIG. 1.
Figure 6:
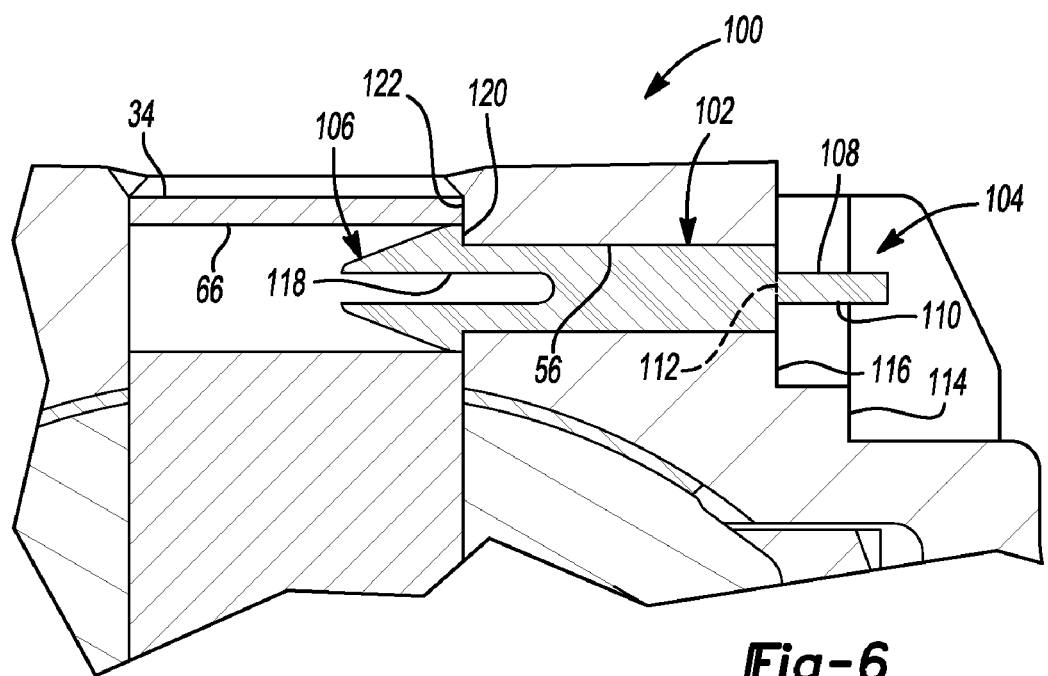
FIG. 6 is a fragmentary sectional side view of the differential assembly shown in FIG. 4.

Referring now primarily to FIGS. 5 through 9, cross pin 34 is shown to be retained within differential housing 32 by a cross pin retainer 100. As best seen in FIG. 6, cross pin retainer 100 is positioned within aligned bores 56 and 66. Although a single cross pin retainer 100 is shown, it should be appreciated that a second cross pin retainer 100 may be positioned in aligned bores 60 and 68 to provide additional retention of cross pin 34. Cross pin retainer 100 is formed of a semi-compliant material (i.e., a polymer, nylon, plastic, etc.) having substantially lower mechanical properties than differential assembly 32 and cross pin 34.

Figure 7:
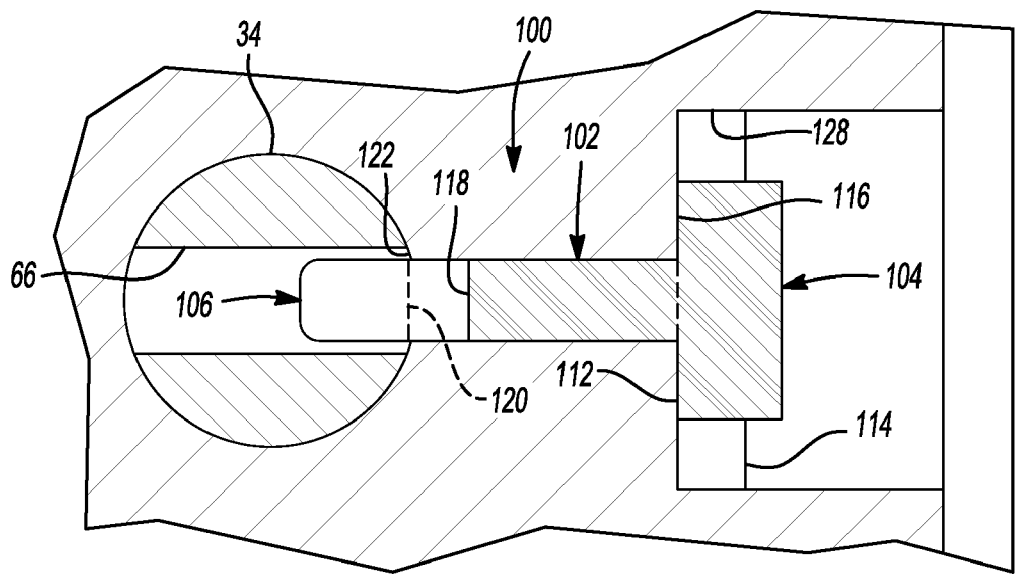
FIG. 7 is a fragmentary sectional top view of the differential assembly shown in FIG. 4.
Figure 8:
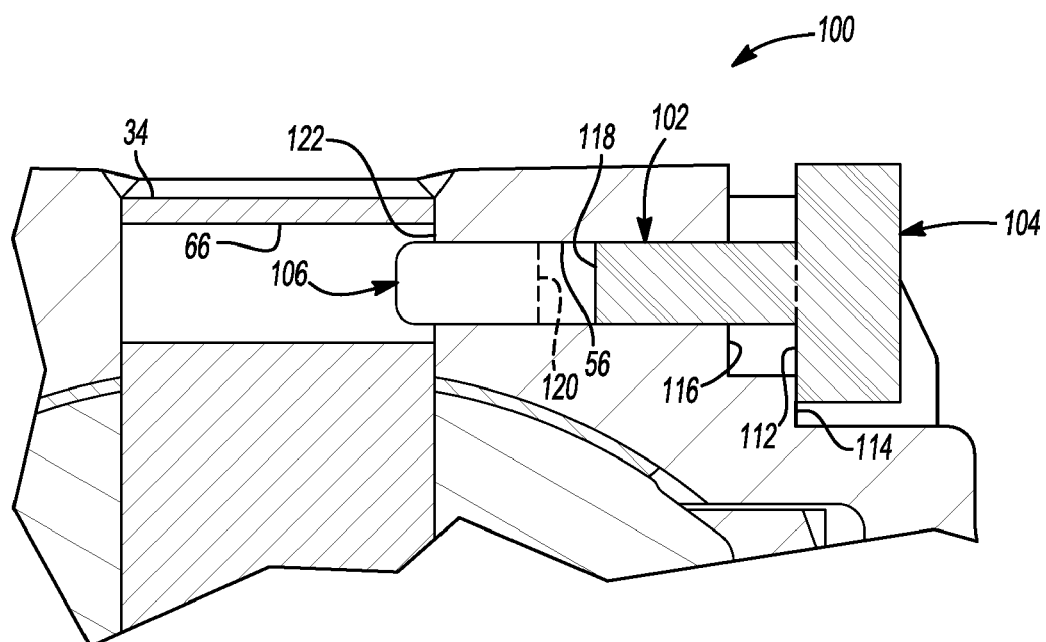
FIG. 8 is a fragmentary sectional side view of the differential assembly shown in FIG. 4 having the cross pin retainer located in a partially-inserted position.
Figure 9:
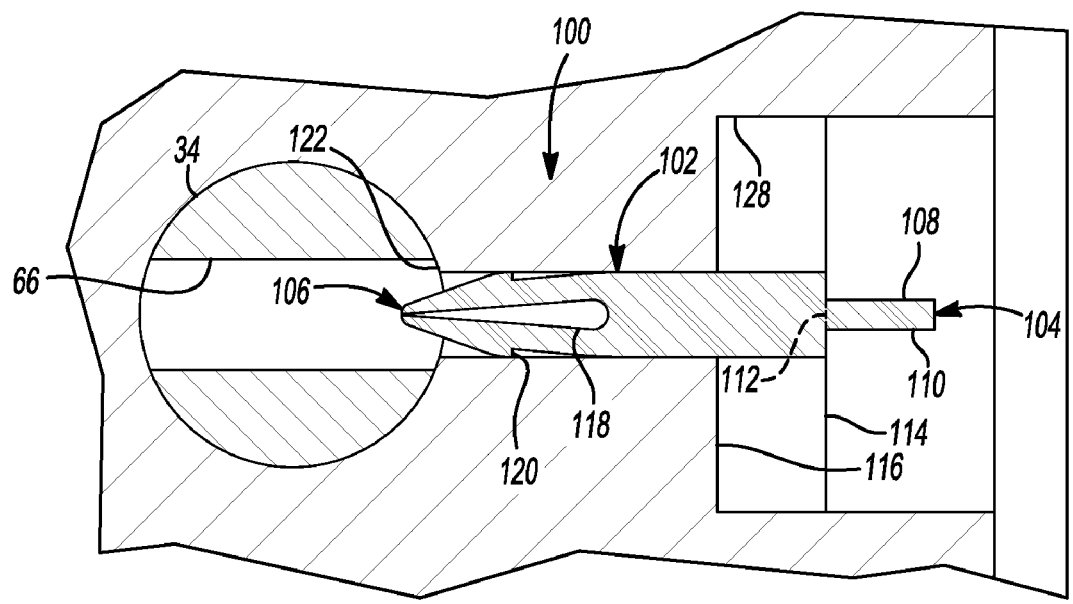
FIG. 9 is a fragmentary sectional top view of the differential assembly shown in FIG. 4 having the cross pin retainer located in a partially-inserted position.

As best seen in FIGS. 6 through 9, cross pin retainer 100 has a body 102, a first end 104 and a second end 106. Body 102 is cylindrically-shaped and adapted to support cross pin retainer 100 within differential housing bore 56. First end 104 may be rectangular in shape and has a pair of opposing face surfaces 108 and 110 and an index surface 112. Opposing face surfaces 108 and 110 are adapted to allow cross pin retainer 100 to be grasped and positioned. Index surface 112 is adapted to engage a first wall surface 114 of differential housing 32 when cross pin retainer 100 is positioned in its partially-inserted position at a first rotational orientation, as shown in FIG. 8. Index surface 112 is also adapted to engage a second wall surface 116 of differential housing 32 when cross pin retainer 100 is positioned in its fully-inserted position at a second rotational orientation, as shown in FIG. 7. Second end 106 is generally conically-shaped to facilitate the insertion of cross pin retainer 100 within housing bore 56 and includes a slot 118 and a retention surface 120.

As best seen from FIG. 5, second end 106 may have, but not limited to, an elliptical base with a minor diameter 124 and a major diameter 126. Minor diameter 124 is substantially equal to the diameter of differential housing bore 56 and is adapted to allow cross pin retainer 100 to be inserted within housing bore 56. Major diameter 126 is greater than the diameter of bore 56 to permit retention of cross pin retainer 100 within differential housing 32 when located in its fully-inserted position. Slot 118 is oriented perpendicular to the axis of major diameter 126 and extends from second end 106 partially into body 102. Slot 118 is dimensioned such that second end 106 may be sufficiently compressed (see FIG. 9) to allow second end 106 to be positioned within differential housing bore 56. Retention surface 120 is adapted to engage a wall 122 defining first aperture 50 when cross pin retainer 100 is located in its full-inserted position.

As previously stated, cross pin retainer 100 may be positioned at a fully-inserted position and at a partially-inserted position to retain cross pin 34. It may be particularly desirable to locate cross pin retainer 100 at the partially-inserted position to permit partial extraction of cross pin retainer 100 and subsequent removal of cross pin 34 during the assembly of drive axle assembly 12. Accordingly, cross pin retainer 100 may be positioned within housing bore 56 at its partially-inserted position by grasping and positioning first end 104 at the first rotational position with respect to differential housing 32, inserting second end 106 within differential housing bore 56 and translating cross pin retainer 100 toward first aperture 50 until index surface 112 engages first wall surface 114 of differential housing 32. When cross pin retainer 100 is located in its partially-inserted position, a portion of second end 106 extends into aperture 50 to provide retention of cross pin 34, yet cross pin retainer 100 may be easily retracted from housing bore 56.

Cross pin retainer 100 may then be positioned within housing bore 56 to a fully-inserted position by grasping and rotating first end 104 to its second rotational position with respect to differential housing 32 and further translating cross pin retainer 100 toward first aperture 50 until index surface 112 engages second wall surface 116 of differential housing 32. When cross pin retainer 100 is in its fully-inserted position, second end 106 is positioned within aperture 50 such that retention surface 120 engages wall 122 formed by aperture 50, thereby securing cross pin retainer 100 within differential housing 32. Additionally, first end 104 is positioned within a channel (see FIG. 3) having a bottom formed by second wall surface 116 and sides formed by a wall 128. Wall 128 provides a clearance between first end 104 and differential housing 32 at the second rotational orientation, but substantially limits rotation of first end 104 when cross pin retainer 100 is located in its fully-inserted position. Should it be desired, a second cross pin retainer 100 may be positioned within bores 60 and 68 in a manner similar to that just described.

It should be appreciated that differential assembly 20 is serviceable should the need arise. Because cross pin retainer 100 exhibits substantially lower mechanical properties than cross pin 34 or differential housing 32, differential assembly 20 may be disassembled by shearing cross pin retainer 100 by driving cross pin 34 along its longitudinal axis. Once disassembled, differential assembly 20 may be serviced and reassembled by positioning either one or two new cross pin retainers 100 within differential housing 32 in the manner previously described. Removal of cross pin retainer 100 may also be facilitated by heating differential housing 32 and cross pin 34 to a sufficient temperature to cause cross pin 100 to melt and then driving cross pin 34 along its longitudinal axis.

With reference now to FIGS. 10 through 13, another cross pin retention system in accordance with the present disclosure will be more fully described. A cross pin retainer 200 includes a retention member 202 in slidable receipt of a support pin 204, a first end 206, and a second end 208. Retention member 202 includes a body 210 having a throughbore 212 in receipt of pin 204. Bore 212 is coaxially aligned with body 210 and extends through first end 206 and body 210 to permit the insertion of support pin 204 into body 210. Support pin 204 has a shaft 216 and a head 218. Shaft 216 is cylindrical and is adapted to fit snugly in bore 212. Head 218 is larger than bore 212 and has a face surface 220 adapted to engage a face surface 222 of first end 206 when support pin 204 is positioned at a fully-inserted position. Preferably, support pin 204 is formed of a material with mechanical properties greater than those of retention member 202, but substantially lower than differential housing 32.

Figure 10:
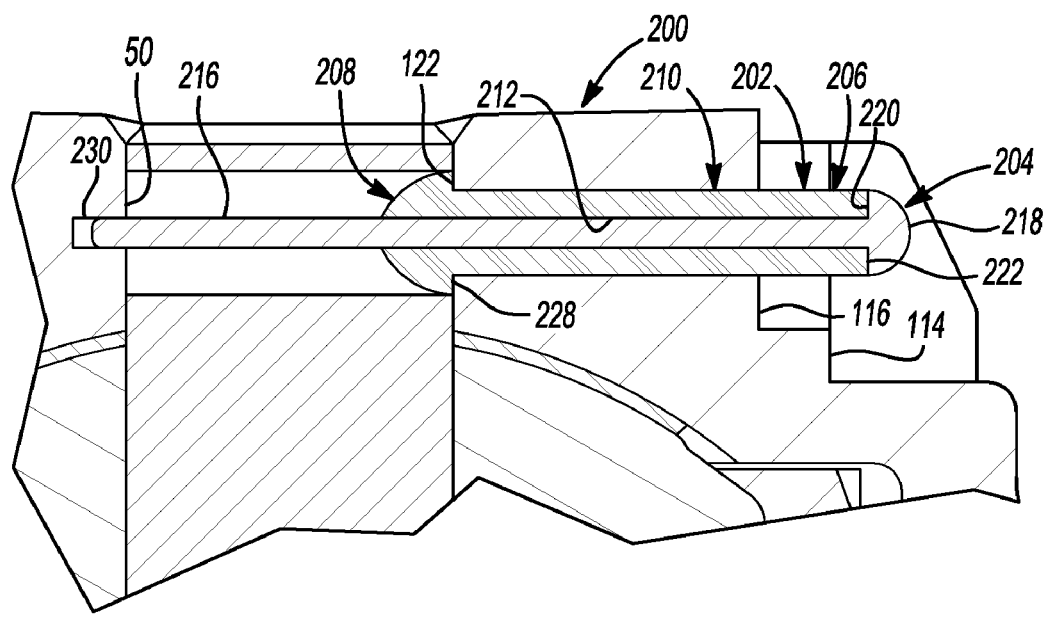
FIG. 10 is a fragmentary sectional side view of another differential assembly.
Figure 11:
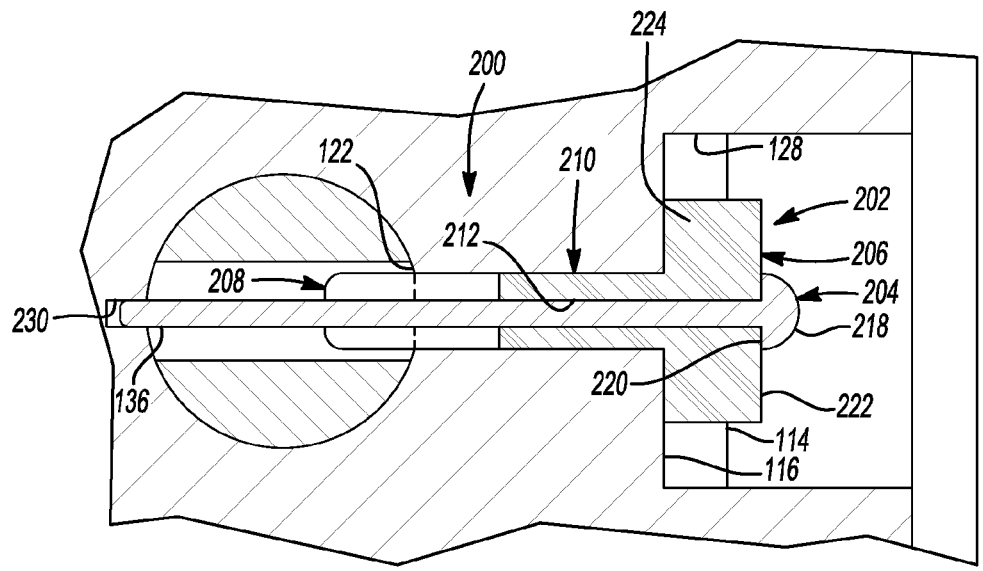
FIG. 11 is a fragmentary sectional top view of the differential assembly shown in FIG. 10 having the cross pin retainer located in a fully-inserted position.
Figure 12:
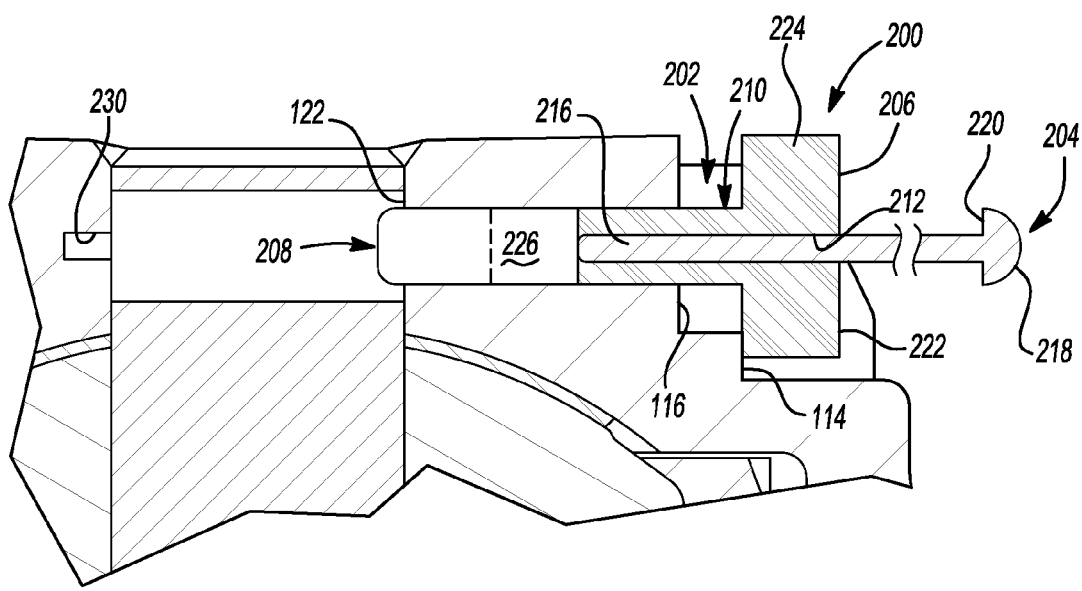
FIG. 12 is a fragmentary sectional side view of the differential assembly shown in FIG. 10 having the cross pin retainer located in a partially-inserted position.
Figure 13:
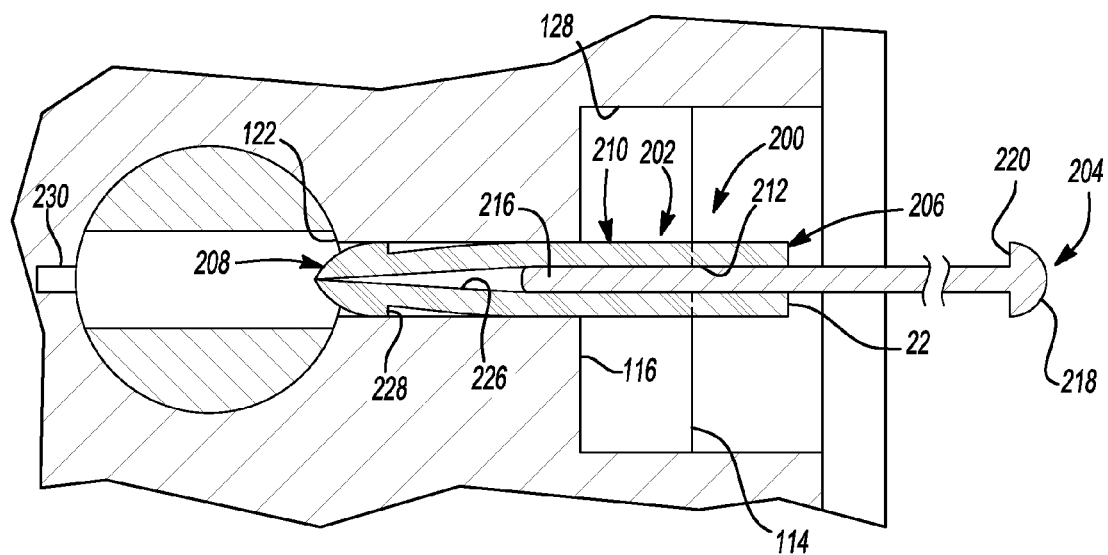
FIG. 13 is a fragmentary sectional top view of the differential assembly shown in FIG. 10 having the cross pin retainer located in a partially-inserted position.

Cross pin retainer 200 may be positioned at a partially-inserted position as shown in FIGS. 12 and 13, as well as at a fully-inserted position as shown in FIGS. 10 and 11. Retention member 202 includes a graspable tab 224 shaped similarly to first end 104 of cross pin retainer 100. Tab 224 operates in a manner substantially similar to first end 104, as previously described for cross pin retainer 100. Support pin 204 is moveable between a first position shown in FIGS. 12 and 13 and a second position shown in FIGS. 10 and 11. Support pin 204 is located in its first position during location of cross pin retainer 200 in its partially-inserted position.

To place cross pin retainer 200 in the fully-inserted position, retention member 202 is displaced toward the fully-inserted position while support pin 204 remains in its first position. Second end 208 is allowed to collapse a slot 226 formed in retention member 202. Once second end 208 enters bore 50, body 210 returns to its undeformed shape and a retention surface 228 engages wall surface 122. At this time, an operator axially displaces support pin 204 from the first position to the second position. Support pin 204 is translated through throughbore 212 and aperture 50 until face surface 220 is seatingly engaged with face surface 222. When fully seated, support pin 204 is positioned within a blind bore 230 in differential housing 32. Blind bore 230 is adapted to receive support pin 204. In this manner, support pin 204 provides additional structural support for cross pin 34 and retention member 202.

It should be appreciated that support pin 204 may have a shaft which is shorter than shown and which may extend through body 210 to second end 208, but does not extend into blind bore 230. It should also be appreciated that support pin 204 may be molded into retention member 202 to form a composite cross pin retainer according the teachings of the present disclosure. Finally, it should also be appreciated that support pin 204 may be subassembled to retention member 202 to facilitate the partial and full insertion of cross pin retainer 200 in differential housing 32.

While two cross pin retainers in accordance with the present retention mechanism have been fully described, other embodiments of the cross pin retainer of the present disclosure, such as those illustrated in FIGS. 14 through 17, will now be described. Referring to FIGS. 14 and 15, a cross pin retainer 300 comprises a retention member 302 and a support pin 304. Support pin 304 is substantially similar to support pin 204 of cross pin retainer 200. Retention member 302 further comprises a body 306, a first end 308 and a second end 310. First end 308 and second end 310 are substantially similar to first end 206 and second end 208 of cross pin retainer 200. Body 306 includes annular fins 312 that are adapted to elastically deform as cross pin retainer 300 is positioned in bore 56 to a partially-inserted position as previously described. To this end, body 306 has a minor diameter 314 that is sufficiently smaller than the diameter of bore 56 to allow annular fins 312 to elastically deform while positioned within bore 56. Annular fins 312 include a retention surface 316 which is adapted to engage wall 122 of aperture 50 when cross pin retainer 300 is positioned in its fully-inserted position, as previously described. Once annular fins 312 are positioned within aperture 50, annular fins 312 expand to cause retention surface 316 to engage wall surface 122.

Referring to FIGS. 16 and 17, a cross pin retainer 400 is shown to include retention member 402 and a support pin 404. Support pin 404 is substantially similar to support pin 204 of cross pin retainer 200. Retention member 402 further comprises a body 406, a first end 408 and a second end 410. First end 408 is substantially similar to first end 206 of cross pin retainer 200. Cross pin retainer 400 further comprises an aperture 412 extending through body 406 and second end 410. Aperture 412 is sized to allow a portion of body 406 and second end 410 to elastically deform as cross pin retainer 400 is positioned in bore 56 to a partially-inserted position as previously described. To this end, aperture 412 has a height 414 that is sufficient to allow a portion of body 406 and second end 410 to elastically deform while positioned within bore 56. Second end 410 includes a retention surface 416 which engages wall surface 122 of aperture 50 when cross pin retainer 400 is positioned in its fully-inserted position as previously described.

The foregoing discussion discloses and describes merely exemplary embodiments of the present invention. One skilled in the art will readily recognize from such discussion, and from the accompanying drawings and claims, that various other changes, modifications and variations may be made therein without department from the spirit and scope of the invention as defined in the following claims.

What is claimed is:

1. A differential assembly, comprising:
    a differential housing defining an internal chamber, an aperture communicating with said chamber and a housing bore communicating with said aperture;
    a gearset disposed within said chamber and including a pair of side gears meshed with at least one pinion gear that is rotatably mounted on a cross pin, an end portion of said cross pin is disposed within said aperture and has a cross pin bore that is alignable with said housing bore; and
    a cross pin retainer disposed in said housing bore and axially moveable relative to said cross pin bore between first and second axial positions in response to rotation of said cross pin retainer relative to said housing, said cross pin retainer having an abutment portion engageable with a first wall portion of said housing when said cross pin retainer is located in a first rotated position to inhibit movement of said cross pin retainer from its first axial position to its second axial position, said abutment portion is further engageable with a second wall portion of said housing when said cross pin retainer is located in a second rotated position to permit movement of said cross pin retainer from its first axial position to its second axial position.

2. The differential assembly of claim 1 wherein said cross pin retainer includes a body portion slideably disposed within said housing bore, a first end defining said abutment portion and a second end defining a resiliently deflectable retention portion.

3. The differential assembly of claim 2 wherein said retention portion of said cross pin retainer is partially positioned within said aperture and said housing bore when said cross pin retainer is located in its first axial position.

4. The differential assembly of claim 3 wherein said retention portion of said cross pin retainer is entirely positioned within said aperture and said housing bore when said cross pin retainer is located in its second axial position.

5. The differential assembly of claim 4 wherein said retention portion is maintained in a deflected condition when said cross pin retainer is located in its first axial position, and wherein said retention portion expands into a non-deflected condition when said cross pin retainer is located in its second axial position such that a retention surface engages a wall surface of said aperture to inhibit retraction of said retention portion from said cross pin bore.

6. The differential assembly of claim 5 wherein said retention portion of said cross pin retainer includes a slot to permit movement between said non-deflected and deflected conditions.

7. The differential assembly of claim 2 wherein said first end of said cross pin retainer further includes a pair of face surfaces defining a handle portion adapted to allow said cross pin retainer to be grasped for axial and rotational movement relative to said differential housing.

8. The differential assembly of claim 2 further including a support member disposed in a throughbore formed in said cross pin retainer, said support member having an end portion engageable with a blind bore formed in said aperture when said cross pin retainer is located in its second axial position.

9. The differential assembly of claim 1 wherein said differential housing includes surfaces configured to restrict rotation of said cross pin retainer from its second rotated position to its first rotated position when said cross pin retainer is located in its second axial position.

10. A differential assembly, comprising:
    a differential housing having an interior chamber, an aperture and a housing bore extending into said aperture;
    first and second side gears rotatably supported within said interior chamber of said differential housing;
    a cross pin supported in said interior chamber of said differential housing and having an end portion positioned within said aperture, said end portion having a transversely extending cross pin bore aligned with said housing bore;
    a pinion gear rotatably supported on said cross pin within said interior chamber and in meshed engagement with said first and second side gears; and
    a cross pin retainer selectively positionable at a partially-inserted position and a fully-inserted position and rotatable between first and second rotated positions with respect to said differential housing, said cross pin retainer including a first end configured to restrict axial movement of said cross pin retainer from its partially-inserted position to its fully-inserted position when located in its first rotational position, said first end further configured to allow axial movement of said cross pin retainer to its fully-inserted position when located in its second rotational position.

11. The differential assembly of claim 10 wherein a second end of said cross pin retainer is at least partially positioned within said aperture and said cross pin bore when said cross pin retainer is located in its partially-inserted position.

12. The differential assembly of claim 11 wherein said second end of said cross pin retainer engages a wall surface of said aperture to restrict removal of said cross pin retainer when located in its fully-inserted position.

13. The differential assembly of claim 11 wherein said second end of said cross pin retainer is bifurcated to allow a retention portion to resiliently deform when inserted into said housing bore.

14. The differential assembly of claim 10 wherein said first end of said cross pin retainer includes face surfaces adapted to allow said cross pin retainer to be grasped and positioned.

15. The differential assembly of claim 10 wherein said cross pin retainer further includes a body having a plurality of radially, outwardly projecting fins adapted to elastically deform to allow said cross pin retainer to be positioned within said housing bore when said cross pin retainer is in its partially-inserted position and to expand to engage a wall portion of said aperture when said cross pin retainer is positioned in its fully-inserted position.

16. The differential assembly of claim 10 further including a support member disposed within a longitudinally extending throughbore in said cross pin retainer, and wherein said support member extends from said first end to a second end of said cross pin retainer.

17. The differential assembly of claim 16 wherein said support member extends through said cross pin retainer and engages a blind bore in said differential housing when said cross pin retainer is positioned in its fully-inserted position, and wherein said blind bore is in communication with said aperture.

18. The differential assembly of claim 10, wherein said differential housing includes surfaces restricting rotation of said cross pin retainer from its second rotational orientation to its first rotational orientation when said cross pin retainer is in its full-inserted position.

19. A method of assembling a differential assembly, comprising:
   providing a differential housing having an aperture and a housing bore;
   positioning a pair of side gears in meshing engagement with a pair of pinion gears within said differential housing;
   positioning a cross pin within said aperture to rotatably support said pinion gears within said differential housing;
   aligning a cross pin bore formed in said cross pin with said housing bore in said differential housing;
   inserting a cross pin retainer into said housing bore;
   rotating said cross pin retainer to a first rotated position and axially translating said cross pin retainer until a first end thereof engages a first wall portion of said differential housing and a second end thereof is partially disposed within said cross pin bore and said aperture to define a partially-inserted position for said cross pin retainer; and
   rotating said cross pin retainer to a second position and axially translating said cross pin retainer until said first end thereof engages a second wall portion of said differential housing and said second end thereof is completely disposed within said cross pin bore and said aperture to define a fully-inserted position for said cross pin retainer.

20. The method of claim 19 further comprising the step of positioning a support member in a throughbore formed in said cross pin retainer, wherein said support member extends at least from said first end to said second end of said cross pin retainer when located in its fully-inserted position.

21. The method of claim 19 further comprising the step of providing said differential housing with a third wall portion configured to restrict rotation of said cross pin retainer from its second rotational position to its first rotational position when located in its fully-inserted position.

22. A differential assembly, comprising:
   a differential housing defining an internal chamber, an aperture communicating with said chamber, and a housing bore communicating with said aperture;
   a gearset disposed within said chamber and including a pinion gear rotatably supported on a cross pin, said cross pin extends into said aperture and has a cross pin bore that is aligned with said housing bore; and
   a cross pin retainer installed in said housing bore and initially located in a partially-installed position relative to said cross pin bore, wherein said cross pin retainer can be rotated to permit axial movement to a fully-inserted position relative to said cross pin bore for securing said cross pin to said differential housing.

* * * * *